US012763828B2

(12) United States Patent
Zhang et al.

(10) Patent No.: US 12,763,828 B2
(45) Date of Patent: Oct. 13, 2026

(54) METHOD AND APPARATUS FOR BEAM MANAGEMENT

(71) Applicant: Lenovo (Beijing) Limited, Beijing (CN)

(72) Inventors: Hongtao Zhang, Beijing (CN); Yao Chen, Beijing (CN); Haiming Wang, Beijing (CN); Haipeng Lei, Beijing (CN)

(73) Assignee: Lenovo (Beijing) Limited, Beijing (CN)

(*) Notice: Subject to any disclaimer, the term of this patent is extended or adjusted under 35 U.S.C. 154(b) by 288 days.

(21) Appl. No.: 18/692,731

(22) PCT Filed: Sep. 17, 2021

(86) PCT No.: PCT/CN2021/119102
§ 371 (c)(1),
(2) Date: Mar. 15, 2024

(87) PCT Pub. No.: WO2023/039843
PCT Pub. Date: Mar. 23, 2023

(65) Prior Publication Data
US 2025/0192836 A1 Jun. 12, 2025

(51) Int. Cl.
*H04B 7/06* (2006.01)
*H04B 7/022* (2017.01)

(52) U.S. Cl.
CPC .......... *H04B 7/0617* (2013.01); *H04B 7/022* (2013.01); *H04B 7/0634* (2013.01)

(58) Field of Classification Search
None
See application file for complete search history.

(56) References Cited

U.S. PATENT DOCUMENTS

| | | | | |
|---|---|---|---|---|
| 9,112,565 B2 * | 8/2015 | Choi | H04B 7/0656 |
| 9,479,240 B1 * | 10/2016 | Caire | H04B 7/024 |
| 10,763,933 B1 * | 9/2020 | Su | H04B 7/0413 |
| 11,212,794 B2 * | 12/2021 | Kakishima | H04W 16/28 |
| 2006/0068738 A1 * | 3/2006 | Li | H04B 7/0413<br>455/277.1 |

(Continued)

FOREIGN PATENT DOCUMENTS

| | | |
|---|---|---|
| WO | 2018009577 A1 | 1/2018 |
| WO | 2021147078 A1 | 7/2021 |
| WO | 2021159460 A1 | 8/2021 |

OTHER PUBLICATIONS

PCT/CN2021/119102 , "International Preliminary Report on Patentability", Mar. 5, 2024, 5 pages.

(Continued)

*Primary Examiner* — Otis L Thompson, Jr.
(74) *Attorney, Agent, or Firm* — FIG. 1 Patents

(57) ABSTRACT

Embodiments of the present disclosure relate to a method and apparatus for beam management. According to some embodiments of the disclosure, a method performed by a UE may include: receiving a pilot signal from a plurality of base stations (BSs); measuring channel state information (CSI) between the UE and each of the plurality of BSs; generating a CSI matrix based on the measured CSI between the UE and the plurality of BSs; encoding the CSI matrix; and transmitting the encoded CSI matrix to one of the plurality of BSs.

20 Claims, 9 Drawing Sheets

(56) References Cited

U.S. PATENT DOCUMENTS

| | | | | |
|---|---|---|---|---|
| 2009/0147728 | A1* | 6/2009 | Atia | H04B 7/0617 370/321 |
| 2010/0112937 | A1* | 5/2010 | Choi | H04B 7/15507 455/9 |
| 2011/0002263 | A1* | 1/2011 | Zhu | H04W 72/21 370/328 |
| 2011/0211547 | A1* | 9/2011 | Kim | H04W 72/046 370/328 |
| 2011/0223928 | A1* | 9/2011 | Seo | H04W 72/54 455/452.1 |
| 2011/0268208 | A1* | 11/2011 | Larsson | H04B 7/022 375/267 |
| 2012/0087265 | A1* | 4/2012 | Tamaki | H01Q 1/246 370/252 |
| 2013/0044683 | A1* | 2/2013 | Maltsev | H04B 7/0684 370/328 |
| 2014/0022988 | A1* | 1/2014 | Davydov | H04W 88/02 370/328 |
| 2015/0016379 | A1* | 1/2015 | Nam | H04L 5/0048 370/329 |
| 2018/0076871 | A1* | 3/2018 | Rahman | H04B 7/0634 |
| 2019/0089437 | A1* | 3/2019 | Chen | H04B 7/0456 |
| 2019/0097694 | A1* | 3/2019 | Jeon | H04B 7/0632 |
| 2019/0115963 | A1* | 4/2019 | Zhu | H04B 7/0617 |
| 2020/0007205 | A1 | 1/2020 | Park et al. | |
| 2020/0076486 | A1* | 3/2020 | Choe | H04B 7/0617 |
| 2020/0322823 | A1* | 10/2020 | Mittal | H04W 24/08 |
| 2020/0355817 | A1* | 11/2020 | Gillian | G01S 7/4026 |
| 2021/0175937 | A1* | 6/2021 | Yamada | H04B 7/088 |
| 2022/0021421 | A1* | 1/2022 | Park | H04B 7/0469 |
| 2022/0200679 | A1* | 6/2022 | Wang | H04B 7/024 |
| 2022/0329297 | A1* | 10/2022 | Lee | H04B 7/0626 |
| 2023/0033864 | A1* | 2/2023 | Shellhammer | H04B 7/0626 |
| 2025/0119193 | A1* | 4/2025 | Zhang | H04B 7/024 |
| 2025/0132800 | A1* | 4/2025 | Kyung | H04L 5/0048 |
| 2025/0192836 | A1* | 6/2025 | Zhang | H04B 7/022 |

OTHER PUBLICATIONS

PCT/CN2021/119102 , "International Search Report and Written Opinion", International Application No. PCT/CN2021/119102, Jun. 16, 2022, 7 pages.

ZTE Corporation , "Beamforming Architecture for NR MIMO", 3GPP TSG RAN WG1 Meeting #86, R1-164215, Gothenburg, Sweden, Aug. 2016, 8 pages.

"Extended European Search Report", EP Application No. 21957127.0, May 22, 2025, 11 pages.

Huang, et al., "Unsupervised Learning-Based Fast Beamforming Design for Downlink MIMO", IEEE, vol. 7, 2019, pp. 7599-7605.

Zhu, et al., "Learning to Beamform in Heterogeneous Massive MIMO Networks", Cornell University, arxiv Preprint, Nov. 8, 2020, 28 pages.

* cited by examiner

METHOD AND APPARATUS FOR BEAM MANAGEMENT

TECHNICAL FIELD

Embodiments of the present disclosure generally relate to wireless communication technology, and more particularly to beam management in a wireless communication system.

BACKGROUND

Wireless communication systems are widely deployed to provide various telecommunication services, such as telephony, video, data, messaging, broadcasts, and so on. Wireless communication systems may employ multiple access technologies capable of supporting communication with multiple users by sharing available system resources (e.g., time, frequency, and power). Examples of wireless communication systems may include fourth generation (4G) systems, such as long term evolution (LTE) systems, LTE-advanced (LTE-A) systems, or LTE-A Pro systems, and fifth generation (5G) systems which may also be referred to as new radio (NR) systems.

As the number of users (e.g., user equipment (UE)) and base stations (BSs) increases, interference among users becomes more and more serious and the scheduling of BS resources becomes quite complicated.

Among the existing beamforming algorithms, nonlinear and objective function optimization algorithms have a high complexity and are difficult to deploy in practice, while linear algorithms have low complexity but unsatisfactory performance. These problems are becoming increasingly evident as the number of users and BSs increases. The industry desires solutions that can provide high performance while maintaining low computational complexity.

SUMMARY

Some embodiments of the present disclosure provide a user equipment (UE). The UE may include: a transceiver; and a processor coupled to the transceiver. The processor may be configured to: receive pilot signals from a plurality of base stations (BSs); measure channel state information (CSI) between the UE and each of the plurality of BSs; generate a CSI matrix based on the measured CSI between the UE and the plurality of BSs; encode the CSI matrix; and transmit the encoded CSI matrix to one of the plurality of BSs.

The processor may be further configured to select the one of the plurality of BSs based on signal strengths or distances between the UE and the plurality of BSs. The CSI matrix may indicate: channel amplitude information associated with the plurality of BSs; channel phase information associated with the plurality of BSs; and a normalization factor associated with the channel amplitude information.

To encode the CSI matrix, the processor may be configured to: quantize the CSI matrix according to an accuracy associated with a codebook; and compare the quantized CSI matrix with elements in the codebook to determine an index for the quantized CSI matrix. To compare the quantized CSI matrix with the elements in the codebook, the processor may be configured to determine a similarity of the quantized CSI matrix and the elements in the codebook by one of the following: calculating a Minkowski distance between the quantized CSI matrix and a corresponding element in the codebook; calculating a cosine similarity between the quantized CSI matrix and the corresponding element in the codebook; calculating a Pearson correlation coefficient between the quantized CSI matrix and the corresponding element in the codebook; calculating a Mahalanobis distance between the quantized CSI matrix and the corresponding element in the codebook; calculating a Jaccard coefficient between the quantized CSI matrix and the corresponding element in the codebook; and calculating a Kullback-Leibler divergence between the quantized CSI matrix and the corresponding element in the codebook. To encode the CSI matrix, the processor may be further configured to compress the index for the quantized CSI matrix, and wherein transmitting the encoded CSI matrix comprises transmitting the compressed index to the one of the plurality of BSs.

Some embodiments of the present disclosure provide a BS. The BS may include: a transceiver; and a processor coupled to the transceiver. The processor may be configured to: receive, from a UE served by the BS, information associated with channel state information (CSI) between the UE and a plurality of BSs including the BS; transmit the information associated with the CSI to a cloud apparatus; receive a beamforming matrix from the cloud apparatus in response to the transmission of the information associated with the CSI; and perform a beamforming operation according to the beamforming matrix.

The CSI between the UE and each of the plurality of BSs may indicate: amplitude information related to a channel between the UE and a corresponding BS; phase information related to the channel between the UE and the corresponding BS; and a normalization factor associated with the amplitude information. The processor may be further configured to add an ID of the BS to the information associated with the CSI before the transmission.

Some embodiments of the present disclosure provide a cloud apparatus. The cloud apparatus may include: a transceiver; and a processor coupled to the transceiver. The processor may be configured to: receive first information associated with channel state information (CSI) between a plurality of user equipment (UE) and a plurality of base stations (BSs), wherein the cloud apparatus manages the plurality of BSs and each of the plurality of UEs accesses a corresponding BS of the plurality of BSs; generate a beamforming matrix based on the first information by a beamforming model deployed on the cloud apparatus; and transmit the beamforming matrix to the plurality of BSs.

Some embodiments of the present disclosure provide a method for wireless communication performed by a user equipment (UE). The method may include: receiving pilot signals from a plurality of base stations (BSs); measuring channel state information (CSI) between the UE and each of the plurality of BSs; generating a CSI matrix based on the measured CSI between the UE and the plurality of BSs; encoding the CSI matrix; and transmitting the encoded CSI matrix to one of the plurality of BSs.

Some embodiments of the present disclosure provide a method for wireless communication performed by a BS. The method may include: receiving, from a UE served by the BS, information associated with channel state information (CSI) between the UE and a plurality of BSs including the BS; transmitting the information associated with the CSI to a cloud apparatus; receiving a beamforming matrix from the cloud apparatus in response to the transmission of the information associated with the CSI; and performing a beamforming operation according to the beamforming matrix.

Some embodiments of the present disclosure provide a method for wireless communication performed by a cloud apparatus. The method may include: receiving first information associated with channel state information (CSI) between a plurality of user equipment (UE) and a plurality of base stations (BSs), wherein the cloud apparatus manages the plurality of BSs and each of the plurality of UEs accesses a corresponding BS of the plurality of BSs; generating a beamforming matrix based on the first information by a beamforming model deployed on the cloud apparatus; and transmitting the beamforming matrix to the plurality of BSs.

Some embodiments of the present disclosure provide an apparatus. The apparatus may be a UE, a BS, or a cloud apparatus. According to some embodiments of the present disclosure, the apparatus may include: at least one non-transitory computer-readable medium having stored thereon computer-executable instructions; at least one receiving circuitry; at least one transmitting circuitry; and at least one processor coupled to the at least one non-transitory computer-readable medium, the at least one receiving circuitry and the at least one transmitting circuitry, wherein the at least one non-transitory computer-readable medium and the computer executable instructions may be configured to, with the at least one processor, cause the apparatus to perform a method according to some embodiments of the present disclosure.

BRIEF DESCRIPTION OF THE DRAWINGS

In order to describe the manner in which the advantages and features of the disclosure can be obtained, a description of the disclosure is rendered by reference to specific embodiments thereof, which are illustrated in the appended drawings. These drawings depict only exemplary embodiments of the disclosure and are not therefore to be considered limiting of its scope.

DETAILED DESCRIPTION

Figure 1:
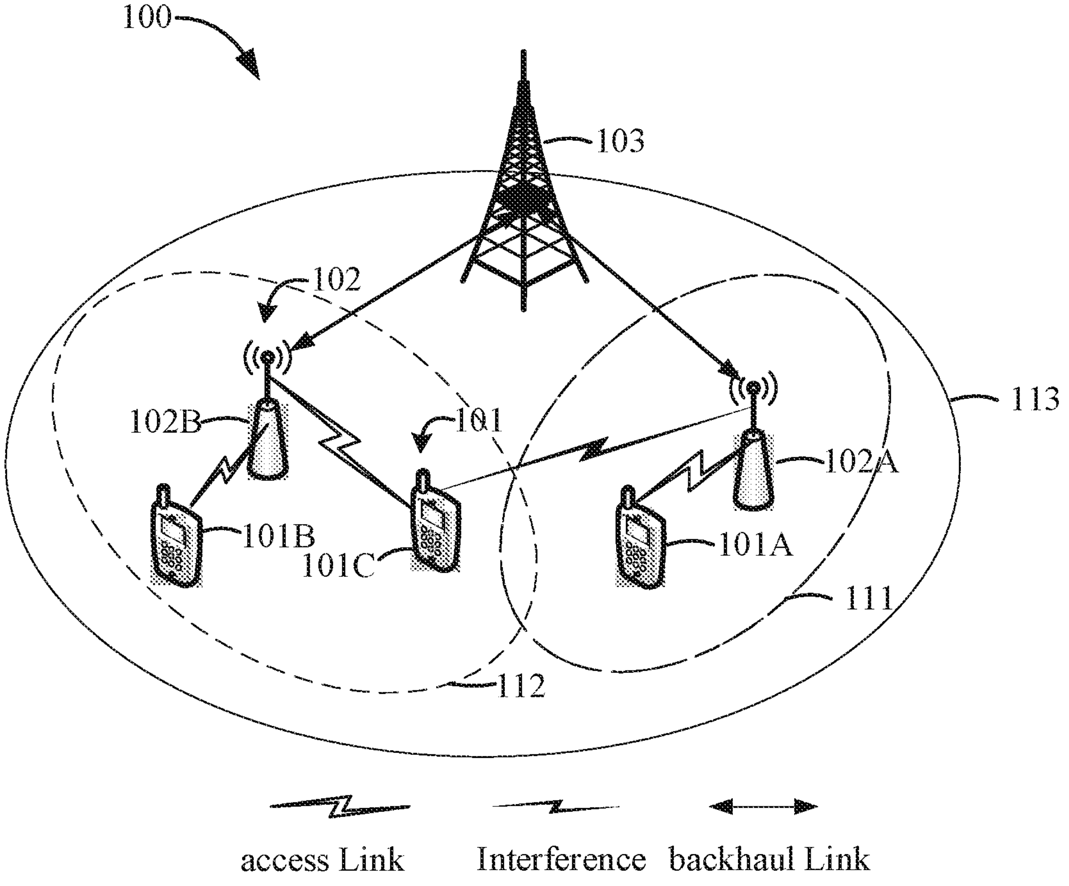
FIG. 1 illustrates a schematic diagram of a wireless communication system in accordance with some embodiments of the present disclosure.

The detailed descriptions section of the appended drawings are intended as a description of the preferred embodiments of the present disclosure and are not intended to represent the only form in which the present disclosure may be practiced. It should be understood that the same or equivalent functions may be accomplished by different embodiments that are intended to be encompassed within the spirit and scope of the present disclosure.

Reference will now be made in detail to some embodiments of the present disclosure, examples of which are illustrated in the accompanying drawings. To facilitate understanding, embodiments are provided under specific network architecture and new service scenarios, such as the 3rd generation partnership project (3GPP) 5G (NR), 3GPP long-term evolution (LTE) Release 8, and so on. It is contemplated that along with the developments of network architectures and new service scenarios, all embodiments in the present disclosure are also applicable to similar technical problems; and moreover, the terminologies recited in the present disclosure may change, which should not affect the principles of the present disclosure.

For example, in the context of the present disclosure, user equipment (UE) may include computing devices, such as desktop computers, laptop computers, personal digital assistants (PDAs), tablet computers, smart televisions (e.g., televisions connected to the Internet), set-top boxes, game consoles, security systems (including security cameras), vehicle on-board computers, network devices (e.g., routers, switches, and modems), or the like. According to some embodiments of the present disclosure, the UE may include a portable wireless communication device, a smart phone, a cellular telephone, a flip phone, a device having a subscriber identity module, a personal computer, a selective call receiver, or any other device that is capable of sending and receiving communication signals on a wireless network. In some embodiments of the present disclosure, the UE includes wearable devices, such as smart watches, fitness bands, optical head-mounted displays, or the like. Moreover, the UE may be referred to as a subscriber unit, a mobile, a mobile station, a user, a terminal, a mobile terminal, a wireless terminal, a fixed terminal, a subscriber station, a user terminal, or a device, or described using other terminology used in the art. The present disclosure is not intended to be limited to the implementation of any particular UE.

In the context of the present disclosure, a base station (BS) may also be referred to as an access point, an access terminal, a base, a base unit, a macro cell, a Node-B, an evolved Node B (eNB), a gNB, a Home Node-B, a relay node, or a device, or described using other terminology used in the art. The BS is generally a part of a radio access network that may include one or more controllers communicably coupled to one or more corresponding BSs. The present disclosure is not intended to be limited to the implementation of any particular BS.

In the context of the present disclosure, the UE may communicate with a BS via uplink (UL) communication signals. The BS may communicate with UE(s) via downlink (DL) communication signals.

FIG. 1 illustrates a schematic diagram of a wireless communication system 100 in accordance with some embodiments of the present disclosure.

The wireless communication system 100 may be compatible with any type of network that is capable of sending and receiving wireless communication signals. For example, the wireless communication system 100 is compatible with a wireless communication network, a cellular telephone network, a time division multiple access (TDMA)-based network, a code division multiple access (CDMA)-based network, an orthogonal frequency division multiple access (OFDMA)-based network, an LTE network, a 3GPP-based network, a 3GPP 5G network, a satellite communications network, a high altitude platform network, and/or other communications networks. The present disclosure is not intended to be limited to the implementation of any particular wireless communication system architecture or protocol.

As shown in FIG. 1, a wireless communication system 100 may include some UEs 101 (e.g., UEs 101A-101C), and some BSs (e.g., BSs 103, 102A and 102B). Although a specific number of UEs and BS are depicted in FIG. 1, it is contemplated that any number of UEs and BSs may be included in the wireless communication system 100.

BS 103 may be a macro BS (MBS) or a logical center (e.g., anchor point) managing BSs 102A and 102B. In some examples, the BS(s) 102 may also be referred to a micro BS, a Pico BS, a Femto BS, a low power node (LPN), a remote radio-frequency head (RRH) or described using other terminology used in the art.

The coverage of BS(s) 102 (e.g., coverage 111 of BS 102A and coverage 112 of BS 102B) may be in the coverage 113 of BS 103. BS 103 and BS(s) 102 can exchange data, signaling (e.g., control signaling), or both with each other via a backhaul link. BS 103 may be used as a distributed anchor. BS(s) 102 may have connections with users, e.g., UE(s) 101. Each UE 101 may be served by a BS 102. For example, referring to FIG. 1, UE 101A may be served by BS 102A. UE 101B and UE 101C may be served by BS 102B.

To meet the demand for fast-growing wireless data services, wireless communication system 100 may support massive multiple-input multiple-output (MIMO) technology which has significant advantages in terms of enhanced spectrum and energy efficiency, supporting large data and providing high-speed and reliable data communication.

However, this may bring about some problems. For example, there may be multiuser interference. For instance, the performance of a user may significantly degrade due to such interference from other users. To tackle this problem, interference reduction or cancellation techniques, such as maximum likelihood multiuser detection for the uplink, dirty paper coding (DPC) techniques for the downlink, or interference alignment, may be employed. However, these techniques are complicated and have high computational complexity.

The acquisition of channel state information (CSI) may also be problematic. For instance, in order to achieve a high spatial multiplexing gain, the BS may need to process the received signals coherently. This requires accurate and timely acquisition of the CSI, which can be challenging, especially in high mobility scenarios.

The more antennas a BS is equipped with, the more degrees of freedom are offered, and hence, more users can simultaneously communicate in the same time-frequency resource. As a result, a huge sum of throughput can be obtained. With large antenna arrays, conventional signal processing techniques become prohibitively complex due to high signal dimensions. It would be hard to obtain a huge multiplexing gain with low-complexity signal processing and low-cost hardware implementation.

In some examples, linear or nonlinear techniques such as weighted minimum mean square error (WMMSE) and DPC may be employed and channel capacity can be enhanced by effectively reusing space resources. However, the computational complexity of these algorithms grows significantly with the number of network variables due to the large number of complex operations involved in the iterations. Although these traditional iterative algorithms can achieve satisfying performance, they cannot meet the requirements of real-time applications.

In some examples, deep learning (also known as "machine learning (ML)") methods may be employed to satisfy both the low complexity and high performance requirements by simple linear or nonlinear transformation operators. In some works of deep learning-based resource allocation, the models are designed to be simple, which causes model representation capability to decrease as the complexity of the system increases. Simply increasing the number of model layers (e.g., depth) cannot effectively improve model performance, and may also cause model performance to degrade due to gradient disappearance and/or explosion. Embodiments of the present disclosure provide enhanced deep learning models to solve the above issues.

In some examples, the deep learning models for beamforming can be classified into supervised learning, unsupervised learning and reinforcement learning.

Supervised learning is to fit labeled data, which in this scenario is to fit the beamforming results calculated by specific mathematical methods. However, supervised learning has two drawbacks. One is that model training requires labeled data, which is costly, and it is difficult for the model to outperform the performance achieved by the mathematical methods. The other is that as the scale of the scene increases, the value of each element in the beamforming matrix will gradually decrease, and the error value on which the model training depends will therefore become smaller, making the model difficult to train and degrading the performance. Known unsupervised learning models may not require labeled data, but may suffer from the problem of poor applicability of the models described above in large-scale scenarios. Known reinforcement learning models, in order to simplify the model design, mostly use the codebook as the output. This makes the model performance largely dependent on the design of the codebook, which is artificially set, increasing the cost of model deployment.

Embodiments of the present disclosure provide solutions to solve the above issues. For example, a deep learning based beamforming method that can well balance real-time and performance is provided. The method may use channel state information (CSI) as the model input, and the model may directly output the final beamforming results, which can be used by the system directly and is better than selecting from determined beams.

Moreover, compared with known artificial intelligence (AI) based beamforming methods, embodiments of the present disclosure may use AI for beamforming design directly, thereby reducing performance loss caused by multi-level settings. Embodiments of the present disclosure may take into account the performance of the beam on the basis of fast and accurate beam management. Embodiments of the present disclosure may be applied to, but are not limited to, a massive MIMO network. More details on the embodiments of the present disclosure will be illustrated in the following text in combination with the appended drawings.

In some embodiments of the present disclosure, a deep learning model for beamforming is applied to balance real-time and performance. Unsupervised learning is employed to train the model, to reduce the training cost and improve the performance of the model in the face of large-scale scenarios. In addition, the structural design of existing deep learning models has the problem of gradient disappearance in large-scale scenarios. To solve this problem, an Inception structure is employed to design the beamforming model based on unsupervised learning. The Inception structure extends the width of the model, and can use a shortcut to connect two layers that are far apart to alleviate the gradient disappearance problem in the case that the model deepens.

The beamforming model may be deployed on a cloud apparatus (e.g., a computing unit of the apparatus). The cloud apparatus can be an MBS or a logical center (anchor point) for cell resource allocation, for example, BS 103 shown in FIG. 1. As stated above, the beamforming model is based on unsupervised learning, and thus does not require labeled data. The beamforming model uses the Inception structure, which can guarantee better performance in large-scale scenarios compared to other models, while having better computational results. Embodiments of the present disclosure propose a model structure design method, rather than a fixed model structure. The method can better match the actual scenario requirements and make the model have the potential to replace mathematical methods in various (including future) networks.

The application scenario may include a cloud (e.g., as a logical center for cell resource allocation) and several BSs connected to users (e.g., UEs), each of which may be served by a BS. The cloud (e.g., BS 103 shown in FIG. 1) may manage the local network, including all BSs (e.g., BS 102A and BS 102B shown in FIG. 1). The beamforming scheme can be summarized as follows:

Model training (1) The cloud may obtain CSI from all UEs to all reachable BSs. The CSI may include amplitude and phase information, and may be divided into a training set and a test set.

(2) The model may learn the CSI of the training set unsupervised until convergence. Then, the model may be evaluated using the test set. The evaluated model may be deployed in the cloud for the BSs' beamforming.

Model Deployment (1) The trained model may be deployed in the cloud (e.g., the computing unit). The model can be updated (e.g., fine-tuned) according to a policy (e.g., fixed time update or other policies).

(2) A UE may measure the CSI for all reachable BSs. The user may access a corresponding BS according to certain principles, such as the signal strength principle, and may report the measured CSI to its serving BS.

(3) A BS may collate the collected CSI and report it to the cloud.

(4) The cloud may organize the collected CSI into a global CSI matrix, which may be used as an input to the deployed model. The model may calculate a global beamforming matrix. The calculated matrix may be split into sub-matrixes, which may be transmitted to corresponding BSs.

(5) The BS may execute a corresponding beamforming operation based on the received beamforming result.

The details will be described in the following text.

In some embodiments of the present disclosure, a UE (e.g., UE 101 in FIG. 1) may receive pilot signals from a plurality of BSs (e.g., BSs 102 in FIG. 1). The plurality of BSs from which the UE can receive pilot signals is also referred to as reachable BSs. The UE may measure the channel state information (CSI) between the UE and each of the plurality of BSs. The measurements may include, for example, amplitude information and phase information associated with corresponding channels between the UE and the plurality of BSs.

The UE may select a BS from the reachable BSs as its serving BS. For example, referring to FIG. 1, UE 101A may select BS 102A as its serving BS, and UE 101B and UE 101C may select BS 102B as their serving BS. The UE may select its serving BS according to various methods. For example, the UE may select its serving BS based on signal strengths or distances between the UE and the reachable BSs.

In some examples, the UE may select a BS with the strongest signal strength (e.g., reference signal received power (RSRP)) as its serving BS. If there are two or more BSs having the same strongest signal strength, the UE may select the one nearest to the UE. In some examples, the UE may select a BS with the closest distance to the UE as the serving BS. If there are two or more BSs having the same closest distance, the UE may select the one with the strongest signal strength. If there are two or more BSs with the same strongest signal strength and the same closest distance to the UE, the UE may randomly select a BS from the two or more BSs. When the user is on the move, BS switching may be performed according to mobile user switching scheme A3 as specified according to the 3GPP specification.

The UE may generate a CSI matrix H based on the measured CSI. The UE may normalize the amplitude with a normalization factor C (also referred to as "amplitude scaling factor") to obtain a normalized amplitude A. The CSI matrix may indicate the normalized amplitude A, the phase B and the normalization factor C. The UE may transmit the generated CSI matrix to its serving BS.

Figure 2:
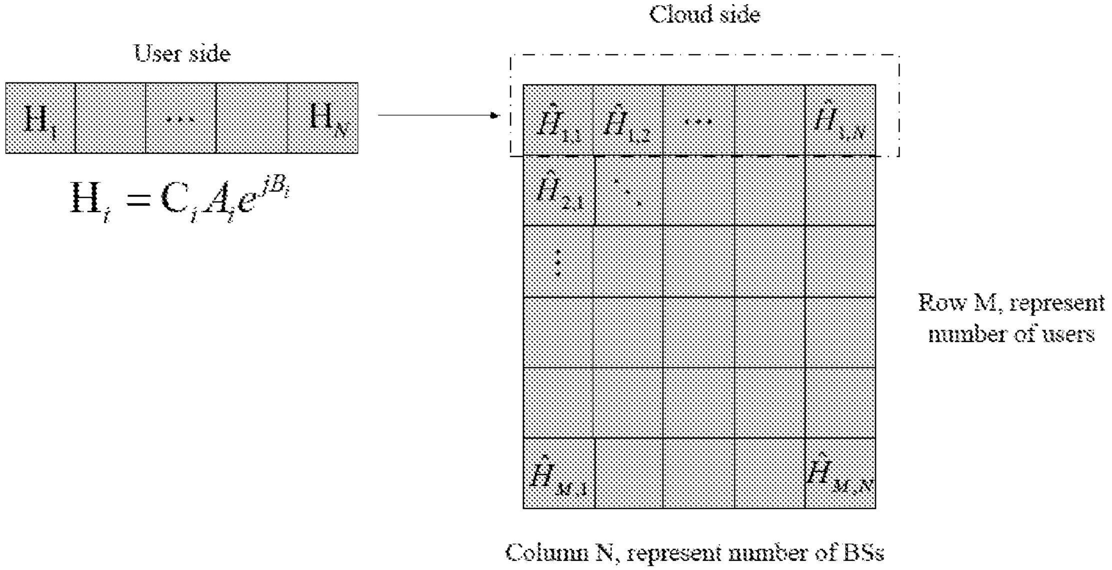
FIG. 2 illustrates an exemplary CSI matrix and an exemplary global CSI matrix in accordance with some embodiments of the present disclosure.

For example, assuming that the UE receives pilot signals from N BSs, the left part of FIG. 2 shows exemplary CSI matrixes $H_1$-$H_N$ generated by the UE. Each of $H_1$-$H_N$ is associated with a corresponding BS of the N BSs. $H_i$ denotes a CSI matrix corresponding to $BS_i$ of the N BSs, $A_i$ and $B_i$ denote the normalized channel amplitude and the channel phase associated with $BS_i$, and $C_i$ denotes the normalization factor associated with $A_i$. The CSI matrixes $H_1$-$H_N$ may be arranged according to a predefined order (e.g., an order associated with the N BSs). Persons skilled in the art would understand that the UE may arrange the CSI associated with reachable BSs in other manners.

In some embodiments of the present disclosure, the UE may encode the generated CSI matrix(es). For example, the UE may quantize a CSI matrix according to an accuracy associated with a codebook, and compare the quantized CSI matrix with elements in the codebook to determine an index for the CSI matrix. The codebook may also be stored at the cloud. In this way, the computational efficiency can be improved and the size of the codebook can also be reduced.

In some embodiments of the present disclosure, quantizing a CSI matrix may include quantizing the elements, e.g., the normalized amplitude and the phase, in the CSI matrix. In some embodiments of the present disclosure, comparing the quantized CSI matrix with elements in the codebook may include comparing the quantized CSI matrix elements with elements in the codebook to determine respective indexes for the quantized CSI matrix elements.

The comparison may be performed according to a similarity computation algorithm, including but not limited to: Minkowski distance; cosine similarity; Pearson correlation coefficient; Mahalanobis distance; Jaccard coefficient; or Kullback-Leibler divergence. For example, when it is determined that a CSI matrix element is most similar to a codebook element, the CSI matrix element can be indicated by the index of the codebook element. A CSI matrix can be indicated by indexes of its elements. For example, the indexes of its elements may be concatenated as the index for the CSI matrix. In some embodiments of the present disclosure, transmitting the generated CSI matrix to the serving BS may include transmitting the index(es) for the CSI matrix(es) to the serving BS.

In some embodiments of the present disclosure, to reduce reporting overhead, the UE may compress the index for the CSI matrix. For example, a lossless data compression may be performed to compress the index(es) for the CSI matrix (es). The lossless data compression algorithm may include, but not limited to, run-length encoding, LZF algorithm, Huffman coding, LZ77 algorithm, and LZ78 algorithm. In some examples, the UE may expand all CSI matrix indexes into one dimension according to a predefined order (e.g., an order associated with the BSs), and then perform the lossless data compression. In some embodiments of the present disclosure, transmitting the generated CSI matrix to the serving BS may include transmitting the compressed index (es) to the serving BS.

In some embodiments of the present disclosure, the codebook and the compression algorithm may be determined based on the actual application situation and a priori knowledge. In some examples, the codebook, the compression algorithm, or both may be exchanged between the serving BS and the UE via radio resource control (RRC) signaling. In some examples, the codebook, the compression algorithm, or both may be predefined, for example, in a standard (s). In principle, the network and the UE should have the same compression algorithm and codebook, and therefore the CSI matrix generated at the UE side can be understood by the network side. For example, the network (e.g., the cloud or the BS) may decode the encoded CSI received based on the codebook.

In some embodiments of the present disclosure, a BS (e.g., BS 102A) may collect, from the UE(s) (e.g., UE 101A) served by the BS, information associated with the CSI between the UE(s) and the reachable BS(s) of the UE(s) (e.g., the index(es) of the CSI matrix(es)). The BS may transmit the collected information to the cloud, which manages the BS. In some embodiments of the present disclosure, the BS may add an ID of the BS to the collected information, for example, at the beginning of the collected information, before the transmission. The BS may receive a beamforming matrix from the cloud in response to the collected information. The BS may then perform a beamforming operation according to the beamforming matrix.

In some embodiments of the present disclosure, the cloud may manage a plurality of BSs, each of which may serve a plurality of UEs. The cloud may receive, information associated with the CSI between the plurality of UEs and the plurality of BSs (e.g., the indexes of CSI matrixes). The cloud may combine the received CSI into a global CSI matrix. The received CSI from the plurality of BSs may be arranged according to a predefined order (e.g., an order associated with the plurality of BSs) to form the global CSI matrix. For instance, the CSI may be arranged according to the IDs of the BSs.

Assuming that the cloud manages N BSs (e.g., $BS_1$-$BS_N$), which serves M UEs (e.g., $UE_1$-$UE_M$), the right part of FIG. 2 shows an exemplary global CSI matrix generated by the cloud. $\hat{H}_{1,1}$ to $\hat{H}_{1,N}$ may denote the CSI matrixes between $UE_1$ and $BS_1$ to $BS_N$, respectively, and $\hat{H}_{N,1}$ to $\hat{H}_{M,N}$ may denote the CSI matrixes between $UE_M$ and $BS_1$ to $BS_N$, respectively. Persons skilled in the art would understand that the global CSI matrix may be arranged in other manners.

A beamforming model may be deployed in the cloud (e.g., a computing unit of the cloud). The design and training of the beamforming model will be described in detail in the following text. The cloud may generate a beamforming matrix based on the CSI (e.g., the global CSI matrix) from the plurality of BSs and may transmit the beamforming matrix to the plurality of BSs. For example, the global CSI matrix may be input into the beamforming model, which may output the beamforming matrix. In this way, the cloud can calculate the beamforming matrix in real time based on the global CSI matrix.

In some embodiments of the present disclosure, the cloud may split the beamforming matrix into a plurality of beamforming sub-matrixes. Each of the plurality of beamforming sub-matrixes may be associated with a corresponding BS of the plurality of BSs. Transmitting the beamforming matrix to the plurality of BSs may include transmit a beamforming sub-matrix of the plurality of beamforming sub-matrixes to a corresponding BS of the plurality of BSs. A BS can perform a beamforming operation according to the corresponding beamforming sub-matrix.

In some embodiments of the present disclosure, the cloud may periodically receive the CSI transmitted by the plurality of BSs. The cloud may perform the above operations (e.g., generating a global CSI matrix, generating the beamforming matrix, and transmitting the same to the BSs) in response to the reception of the CSI.

In some embodiments of the present disclosure, the deployed beamforming model may be updated according to a certain criterion. For example, the deployed beamforming model may be updated periodically (e.g., once a week or month). For example, the deployed beamforming model may be updated dynamically, for example, based on a performance decline of the beamforming model. For instance, when the performance decline of the beamforming model reaches a certain threshold, e.g., a certain percentage (e.g., 80%) of the performance achieved by the WMMSE algorithm, the beamforming model may be updated. Updating the beamforming model may include fine-tuning the parameter(s) of the beamforming model (e.g., a weight of a layer of the beamforming model).

The details of the design and training process of the beamforming model will be described in the following text.

Before beamforming, the cloud may construct an elaborated convolutional neural network to compose the beamforming model. Each layer of the beamforming model may be assigned with a corresponding weight, which can be updated during the training process by back propagation.

In some embodiments of the present disclosure, the beamforming model may include at least one Inception structure. The number of the Inception structures can be determined by the actual application scenario. The Inception structure may convert the original single structure of each layer into a spliced combination of multidimensional structures to enhance the model's ability to extract features.

An Inception structure may include multilayers, such as convolutional layers, batch normalization layers, and activation layers. The activation layers may be included in the convolutional layers and the batch normalization layers of the Inception structure. The Inception structure may include at least two branches, each of which may include at least one convolutional layer. The number of branches is also referred to as the width of the structure. The width is provided by the convolutional layers can reduce the calculation cost of the model. The number of the convolutional layers in a branch may also be referred to as the depth of the branch or Inception structure. The numbers of the convolutional layers in different branches can be the same or different. The convolutional layers in the Inception structure (either within a different or the same branch) may have the same or different convolutional kernel sizes. The number of branches and various layers in the Inception structure and the parameters of the various layers (e.g., convolution kernel size including, for example, 1×1, 2×2, 3×3, or 4×4) can be determined by the actual application scenario.

An Inception structure may include at most one pooling layer for filtering input data which is included in one of the at least two branches. The number of the pooling layers (e.g., 0 or 1) in the Inception structure and the parameters of a pooling layer (e.g., pooling layer size and holding window size) can be determined by the actual application scenario.

An Inception structure may include a shortcut. The presence of shortcuts can alleviate the gradient disappearance problem to a certain extent and make the model perform better. In some examples, the shortcut may connect an input of the inception structure block and an output of the inception structure block. In some examples, the shortcut may connect two internal functional layers of the inception structure block. The number of the shortcuts in the Inception structure and the connection relationship of the shortcut can be determined by the actual application scenario. In some examples, when the internal structure of the inception structure is simple, the performance gain brought by a shortcut may be not obvious, and thus can be omitted.

In some embodiments of the present disclosure, the beamforming model may include an output activation layer for outputting the beamforming matrix. The output activation layer can ensure that the beamforming matrix satisfies a power constraint of the plurality of the BSs while ensuring that the nonlinearity is not lost. In some embodiments of the present disclosure, the beamforming model may output a system rate (e.g., the sum-rate of the plurality of UEs) according to the loss function, which can be used as the basis for determining the completion of the training.

Figure 3:
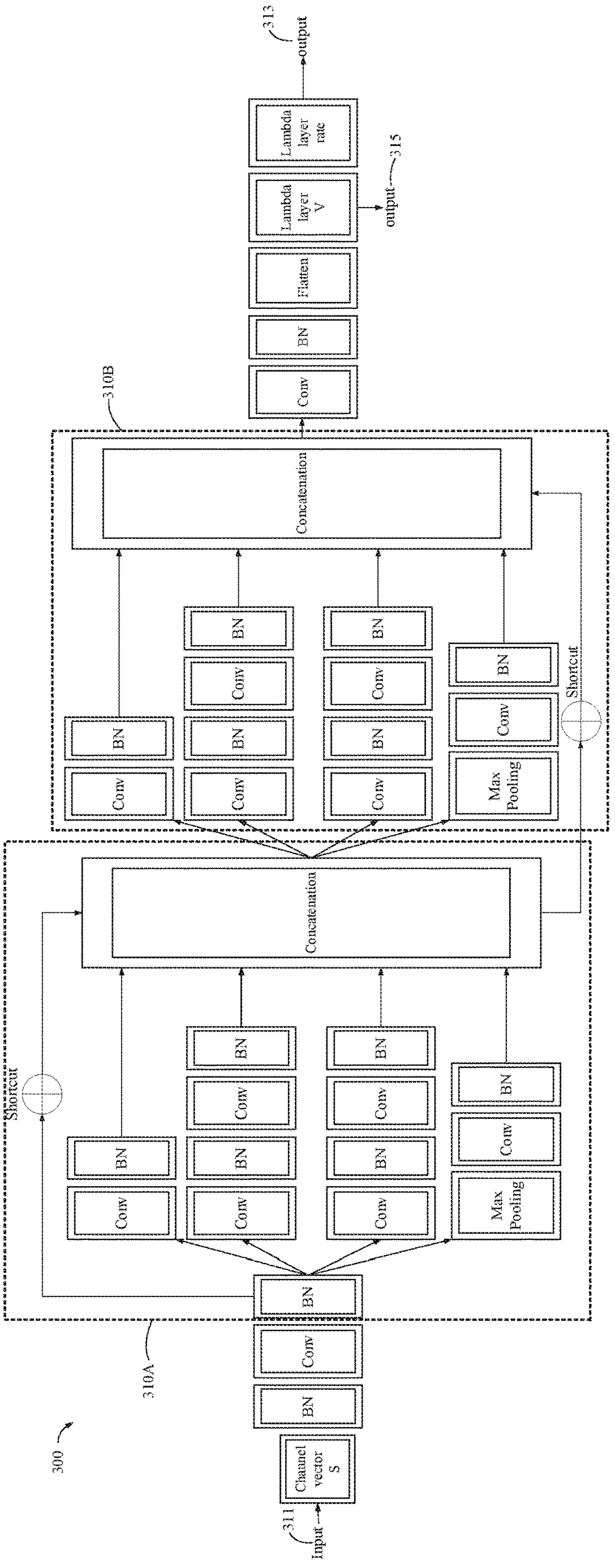
FIG. 3 illustrates a schematic architecture of a beamforming model in accordance with some embodiments of the present disclosure.

FIG. 3 illustrates a schematic architecture of an exemplary beamforming model 300 in accordance with some embodiments of the present disclosure. As shown in FIG. 3, the exemplary beamforming model 300 may include two Inception structures 310A and 310B. Although a specific number of Inception structures and functional layers is depicted in FIG. 3, it is contemplated that any number of Inception structures and functional layers may be included in the beamforming model 300.

The exemplary beamforming model 300 may be input with input 311 and may output outputs 313 and 315. The input 311 may be CSI such as a global CSI matrix(es). In some examples, the input may be processed as a two-dimensional matrix of two channels passing through a convolutional layer with, for example, a 2×2 convolutional kernel, and then through an activation layer (for example, included in the convolutional layer), the output of which may pass through the Inception structures. Outputs 313 and 315 may be a negative system rate and the beamforming matrix, respectively.

After constructing the beamforming model, the beamforming model may be trained offline using collected CSI. For example, the collected CSI (e.g., global CSI matrixes collected before the deployment of the model) may be divided into a training set and a test set. For instance, 70%, 80% or 90% of the collected CSI may be used as the training set while the remaining collected CSI may be used as the test set.

The training set may be iteratively fed into the beamforming model. The parameters of the beamforming model (e.g., weights of layers of the model) may be updated by back propagation during the training of the model, which may continuously increase the system rate (or reduce the negative system rate) obtained from the model prediction beamforming matrix until an end condition is satisfied. For example, the training set may be input into the beamforming model in batches. For instance, the training set may include about 100,000 global CSI matrixes, every 64 global CSI matrixes may be arranged as a batch to be input into the beamforming model. For each batch, the weights of layers of the model may be updated by back propagation. The cloud may iteratively input the training set into the beamforming model until the end condition is met. For example, after all of the training set is input into the beamforming model (which may also be referred to as a single iteration) and the end condition is not satisfied, the cloud may start another iteration until the end condition is met.

There are several options for setting the end condition. In some examples, the end condition may be determined in response to at least one of the following: the number of iterations reaching a training threshold; and an improvement on the system rate being less than or equal to an improvement threshold. For example, the system rate no longer increases or the loss function no longer decreases may mean that the algorithm of the model converges.

In some embodiments of the present disclosure, in response to the end condition being met, the cloud may determine whether the performance of the beamforming model satisfies a performance demand. The perform demand can be a performance value of the beamforming model relative to a mathematical methods (e.g., the WMMSE algorithm or the zero force (ZF) algorithm). For example, the cloud may input the test set into the beamforming model to determine a model performance, when the model performance reaches (i.e., greater than or equal to) a certain percentage (e.g., 80%) of the WMMSE algorithm, it is determined that the model performance satisfies the performance demand.

The cloud may determine the completion of the training in response to determining that the performance of the beamforming model satisfies the performance demand. Then, the cloud may deploy the trained beamforming model for determining a beamforming management scheme for the plurality of BSs.

In response to determining that the performance of the beamforming model fails to satisfy the performance demand, the cloud may, in some examples, update the parameters of the beamforming model to satisfy the performance demand. For instance, the weights of the layers of the model may be fine-tuned. In some examples, the cloud may reconstruct the beamforming model and train the reconstructed beamforming model to satisfy the performance demand.

In some other embodiments of the present disclosure, all the collected CSI may be used for training, and the model training is completed in response to an end condition being met.

The following text describes an example of unsupervised learning-based beam management. For convenience, a single base station massive MIMO scenario is taken as an example to illustrate this.

A transmitter at a BS equipped with P antennas may serve K UEs (e.g., $UE_1$ to $UE_K$), each with Q receive antennas. The channel between a $UE_k$ ($\in UE_1$ to $UE_K$) and the BS can be denoted as a matrix $H_k \in C^{[Q\times P]}$ which may include channel gains between different transceiver antenna-pairs. The received signal at $UE_k$ can be denoted as:

$$y_k = H_k s_k + n_k$$

where $s_k \in C^{[P\times M]}$ represents the transmitted vector, M represents the number of data streams transmitted by the BS, and $n_k \in C^{[Q\times 1]}$ represents the white Gaussian noise vector at $UE_k$ with covariance $$R_{n_k n_k} = E\left[n_k n_k^H\right] = \sigma^2 I_Q.$$

The transmit vector $s_k$ can be e denoted as the data vector $x_1, \ldots, x_M \in C^{[Q\times M]}$ passing through M linear filters:

$$s_k = \sum_{m=1}^{M} v_m x_m$$

where matrix $V_k=[v_1, \ldots, v_M]$, $v_m \in C^{[F\times M]}$ is a beamforming matrix for user k and $x_m$ is the input vector. It is assumed that the data streams which are received by each UE are independent such that $$E\left[x_m x_m^H\right] = I_M \text{ and } E\left[x_l x_m^H\right] = 0,$$

for t≠m.

In this example, the Saleh-Valenzuela mmWave channel model for $H_k$ with one line-of-sight (LoS) path and (L−1) non-LoS (NLoS) paths is adopted. Thus, $H_k$ can be represented as:

$$H = \sqrt{\frac{N_t N_r}{L}} \sum_{l=1}^{L} \alpha_l a_r(\vartheta_l) a_t^H(\theta_1)$$

$$a(\theta) = \sqrt{\frac{1}{N}} \left[1, e^{j\frac{2\pi}{\lambda} d \sin\theta}, \ldots, e^{j\frac{2\pi}{\lambda}(N-1) d \sin\theta}\right]^T$$

where d represents antenna spacing, $N_t$ represents the number of transmitting antennas, $N_r$ represents the number of receiving antennas, $\alpha_l$ represents the path loss and phase shift of the lth path, $\alpha_r$ represents the array response or steering vector of the receiver, $\alpha_t$ represents the array response or steering vector of the transmitter, λ represents the wavelength of the carrier frequency, $\vartheta_l$ and $\theta_l$ represent the arrival and departure angles of the lth path, respectively, modeled as uniformly distributed within $$\left[-\frac{\pi}{2}, \frac{\pi}{2}\right].$$

Persons skilled in the art would understand that other channel models can also be employed.

The objective of the beamforming model is to maximize the weighted sum-rate of all UEs in the system by designing the beamforming matrixes $V_1, \ldots V_k$. Therefore, the utility maximization problem can be formulated as:

$$[V_1, \ldots V_K] = \max \sum_k u_k R_k$$

$$\text{s.t.} \sum_{k=1}^{K} Tr\left(V_k V_k^H\right) \le P_{max}$$

where

-continued $$R_k = \operatorname{logdet}\left(I_k + V_k^H H_k^H J_{\bar{v}_k}^{-1} H_k V_k\right)$$

$$J_{\bar{v}_k} = I_k + \sum_{i=1, i\neq k}^{K} H_k V_i V_i^H H_k^H$$

$R_k$ represents the spectral efficiency of $UE_k$, $u_k \ge 0$ represents the corresponding weight and can be setting according to the actual scenario, and $P_{max}$ represents the maximum power supported by the BS.

The input of the model is the matrix H indicating CSI between the UEs and all BSs under the management of the cloud, for example, the global CSI matrix as described above. An output of the model may be the beamforming matrix V. The loss function can be represented as:

$$L(\Theta) = -\sum_{i=1}^{I} \text{Rate}_i(\Theta)$$

where Θ represents the parameters of the model.

The model may include a lambda layer (e.g., “Lambda layer rate” in FIG. 3) after the layer for outputting the beamforming matrix to transform the model output to the constraints:

$$\hat{V}_{output} = b\hat{V} = \sqrt{\frac{P_{max}}{Tr\left(\hat{V}\hat{V}^H\right)}}\,\hat{V}$$

where b is a gain factor that ensures the signal in each sample to satisfy the transmit power constraint.

After several iterations of training, the model loss function may, for example, no longer decrease. After the model passes on the test set, the model training is completed.

The unsupervised learning-based beamforming model proposed in the subject disclosure is advantageous in various aspects. For example, compared with supervised learning models, the training cost of the proposed model is low and the training process is easier and simple. In addition, compared with known unsupervised learning models, the proposed model has a novel and better model structure design, and can maintain better system performance in large-scale scenarios.

Figure 4:
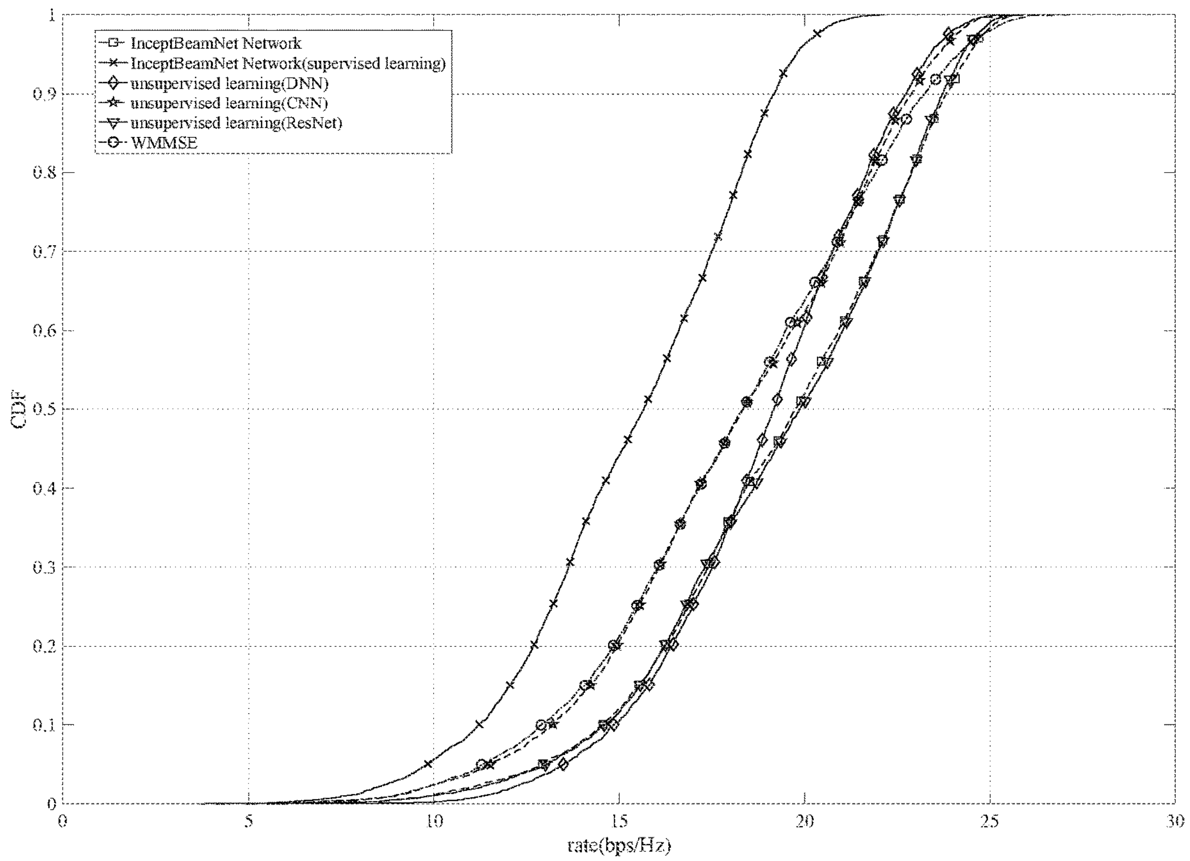
FIGS. 4-6 illustrate exemplary simulation results in accordance with some embodiments of the present disclosure.
Figure 5:
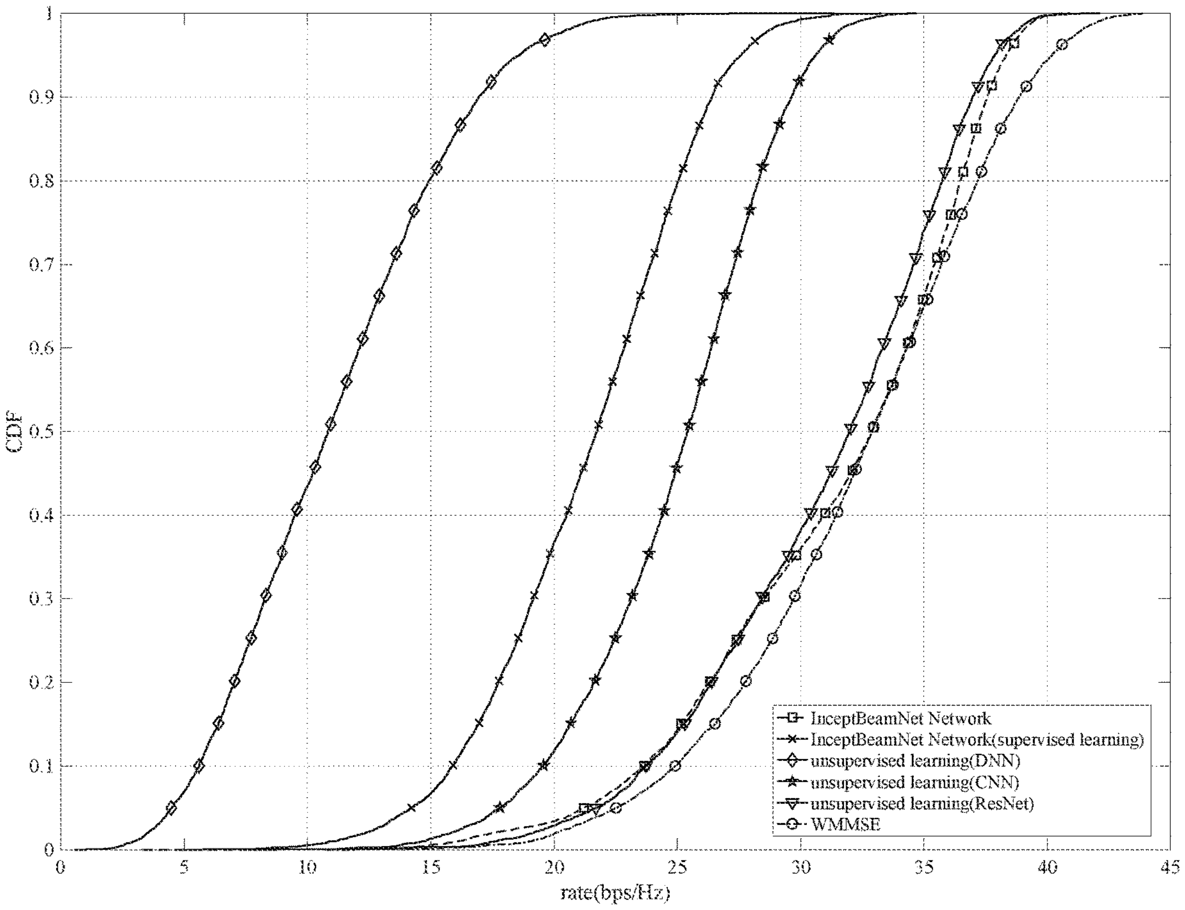
Figure 6:
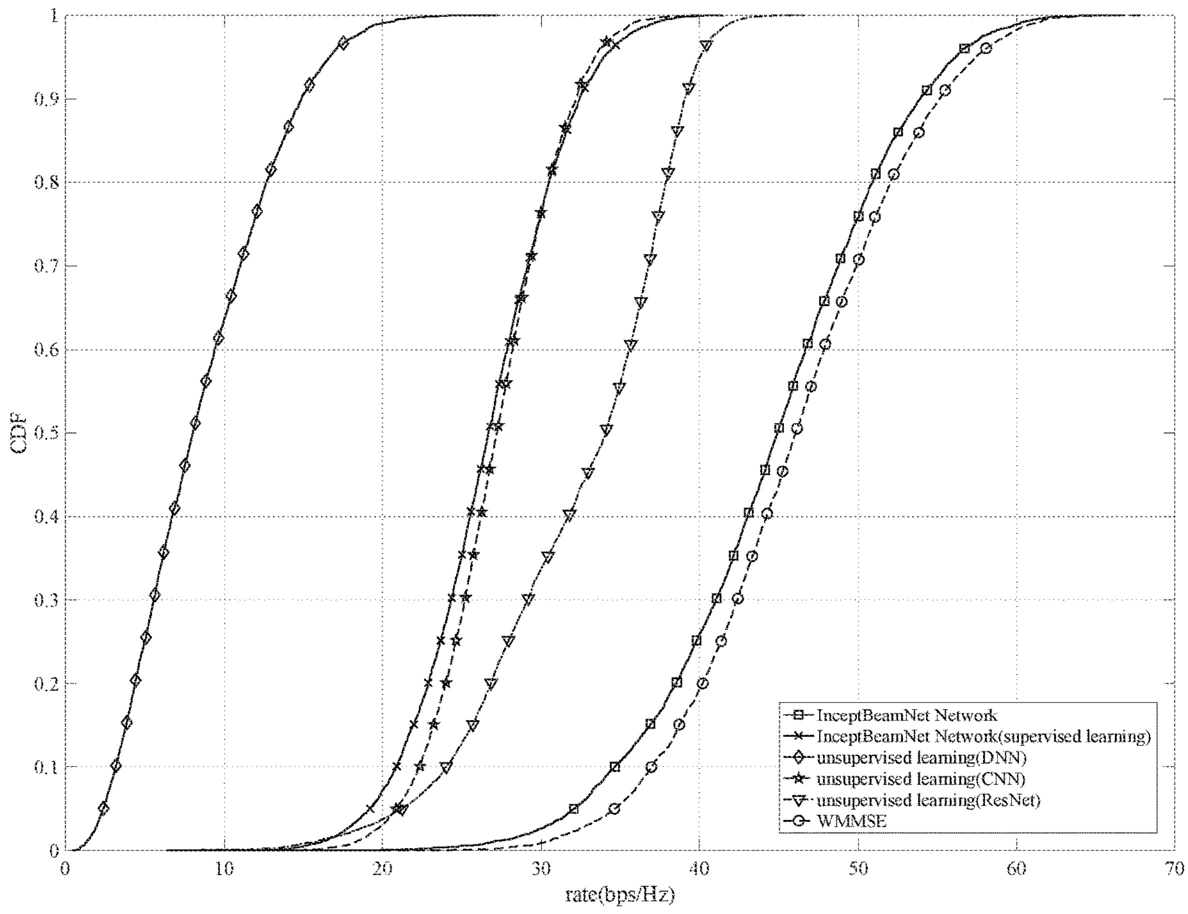

FIGS. 4-6 illustrate exemplary simulation results in accordance with some embodiments of the present disclosure. These figures compare the model performance for different numbers of BS and user antennas. In these figures, the stop iteration accuracy of the WMMSE algorithm is 1e-6, the number of stop iteration steps is 5000, “UE” represents the number of users (e.g., UEs), “BS” represents the number of base stations, “Nr” represents the number of base station antennas, “Nr” represents the number of user antennas, and “L” represents the number of paths.

FIG. 4 shows cumulative distribution function (CDF) curves of spectral efficiency (SE) in different scenarios where UE=5, BS=1, Nt=32, Nr=2, and L=3. FIG. 5 shows CDF curves of SE in different scenarios where UE=5, BS=1, Nt=64, Nr=16, and L=3. FIG. 6 shows CDF curves of SE in different scenarios where UE=10, BS=1, Nt-64, Nr=16, and L=3.

FIGS. 4-6 compare the spectral performance of the beamforming method of the present disclosure with other solutions in different scenarios, including: 1) supervised learning training method for the same model; 2) deep neural network model; 3) convolutional neural network model; 4) ResNet neural network model; 5) unsupervised learning model designed by the present invention; and 6) WMMSE algorithm.

From FIGS. 4-6, it can be concluded that the performance of the known AI solutions decrease severely with the increase of scene size. This is because with the increase of scene size, the existing model will have the problem of gradient disappearance. The performance of supervised learning decreases severely with the increase of scene size because the increase of scene size is accompanied by the decrease of each element value in the beamforming, and the difference value will be small when calculating the back propagation of the difference with the label data, which is not conducive to the back propagation of the model.

The performance of the ResNet neural network model is also inferior to the model of the present disclosure because of the single structure of each layer of the ResNet model and the reduced ability to capture the structure of the scene in large-scale scenarios. Therefore, the structure of the present disclosure is better.

Table 1 below shows the spectral efficiency and computational performance for different schemes.

the UE may select a BS from the plurality of BSs as its serving BS according to one of the methods as described above. For example, the selection may be based on signal strengths or distances between the UE and the plurality of BSs.

In operation 713, the UE may measure CSI between the UE and each of the plurality of BSs. The CSI may include, for example, channel amplitude and channel phase information associated with respective BSs.

In operation 715, the UE may generate a CSI matrix based on the measured CSI between the UE and the plurality of BSs. In some embodiments, the CSI matrix may indicate channel amplitude information associated with the plurality of BSs, and channel phase information associated with the plurality of BSs. The UE may select a suitable normalization factor for channel amplitude information associated with each BS. The CSI matrix may further indicate the normalization factor associated with the channel amplitude information.

In operation 717, the UE may encode the CSI matrix. For example, the UE may quantize the CSI matrix according to an accuracy associated with a codebook. The codebook may be shared by the UE and the network. The UE may quantize the elements, e.g., the amplitude and phase information, in the CSI matrix.

| (UE, Nt, Nr) | Indicators | DNN | CNN | ResNet | Proposed model (supervised learning) | Proposed model | WMMSE |
|---|---|---|---|---|---|---|---|
| (5, 32, 2) | Spectral | 18.93 | 18.17 | 19.40 | 15.36 | 19.37 | 18.19 |
| (5, 64, 16) | efficiency | 11.08 | 24.93 | 31.03 | 21.37 | 31.44 | 32.32 |
| (10, 64, 16) | (bps/Hz) | 8.62 | 27.19 | 32.42 | 26.67 | 44.61 | 46.05 |
| (5, 32, 2) | Average | 0.000052 | 0.000051 | 0.000066 | 0.000063 | 0.000063 | 7 |
| (5, 64, 16) | calculation | 0.00071 | 0.00073 | 0.00080 | 0.00078 | 0.00078 | 191 |
| (10, 64, 16) | time (second) | 0.00078 | 0.00082 | 0.00096 | 0.00087 | 0.00087 | 402 |

From the above table, it can be concluded that the computational time consumed by the ML model increases slowly as the scene size increases, while the time consumed by the WMMSE algorithm increases rapidly, so the ML-based model can better guarantee real-time computational results.

It can also be concluded that the performance of all algorithms decreases with the increase of the number of users. However, in a maximum scenario (for example, UE=10, Nt=64, and Nr=16), the model proposed in the present disclosure still achieves a performance of more than 96% of the WMMSE algorithm, while the performance of other models is already less than 70%. This shows that the model structure proposed in the present disclosure can well guarantee the performance of the model in large-scale scenarios.

To sum up, the present disclosure comprehensively considers the beamforming management method and the service process design, and improves the performance in massive MIMO, which has universality and can be applied more practically.

Figure 7:
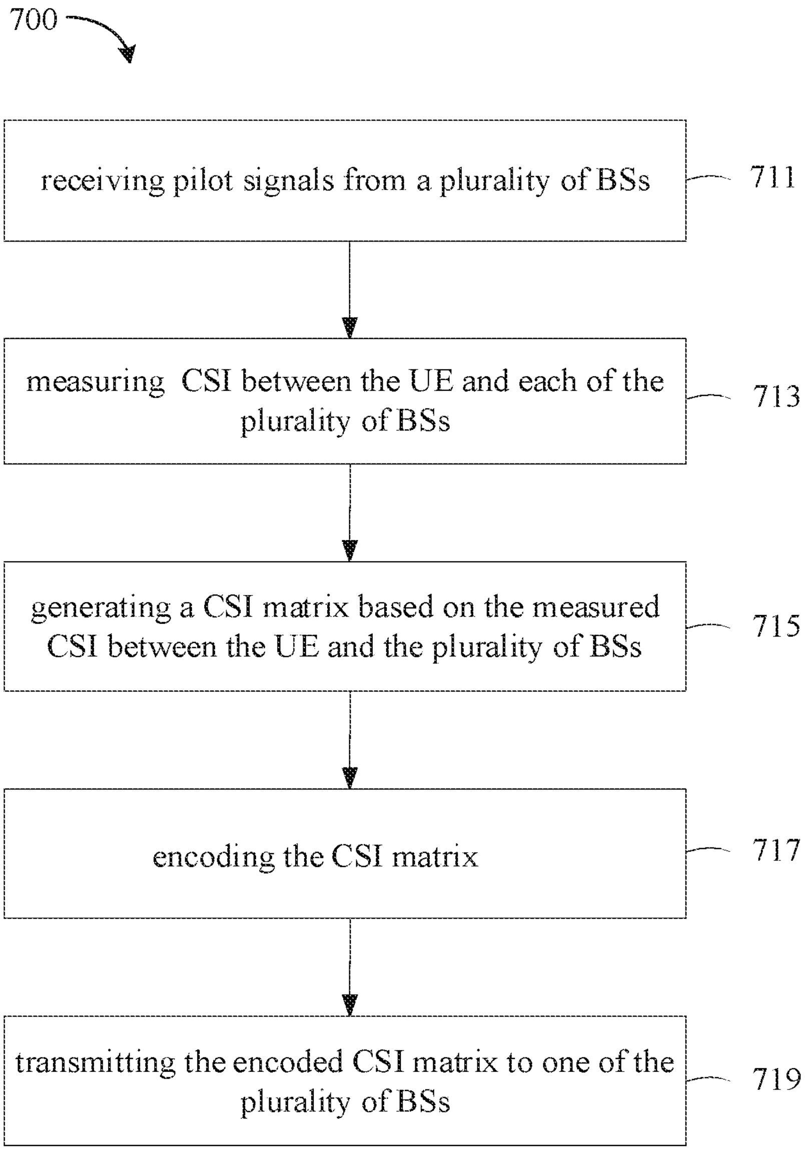
FIG. 7 illustrates a flow chart of an exemplary procedure performed by a UE in accordance with some embodiments of the present disclosure.

FIG. 7 illustrates a flow chart of an exemplary procedure 700 performed by a UE in accordance with some embodiments of the present disclosure. Details described in all of the foregoing embodiments of the present disclosure are applicable for the embodiments shown in FIG. 7. In some examples, the procedure may be performed by UE 101 in FIG. 1.

Referring to FIG. 7, in operation 711, a UE may receive pilot signals from a plurality of BSs. In some embodiments, Then, the UE may compare the quantized CSI matrix with the codebook to determine an index for the quantized CSI matrix. For example, the UE may compare the quantized elements in the CSI matrix with the elements in the codebook to determine indexes for the quantized elements in the CSI matrix, which may be used as the index for the quantized CSI matrix.

In some embodiments, to compare the quantized CSI matrix with the elements in the codebook, the UE may determine a similarity of the quantized CSI matrix (e.g., quantized elements in the CSI matrix) and the elements in the codebook. Various methods can be employed for determining the similarity. For example, a Minkowski distance, a cosine similarity, a Pearson correlation coefficient, a Mahalanobis distance, a Jaccard coefficient, or a Kullback-Leibler divergence between the quantized CSI matrix and a corresponding element in the codebook may be calculated.

In some embodiments, to reduce overhead, the UE may compress the index for the quantized CSI matrix. Various data compression algorithm can be employed. For example, a lossless data compression algorithm, such as run-length encoding, LZF algorithm, Huffman coding, LZ77 algorithm, or LZ78 algorithm can be employed. The network and the UE should have the same understanding of the data compression algorithm. For example, the data compression algorithm can be predefined or communicated between the UE and the network via, for example, RRC signaling.

In operation 719, the UE may transmit the encoded CSI matrix to one of the plurality of BSs, for example, the serving BS of the UE. In some embodiments, transmitting the encoded CSI matrix may include transmitting the index for the quantized CSI matrix or the compressed index to the serving BS.

It should be appreciated by persons skilled in the art that the sequence of the operations in exemplary procedure 700 may be changed and some of the operations in exemplary procedure 700 may be eliminated or modified, without departing from the spirit and scope of the disclosure.

Figure 8:
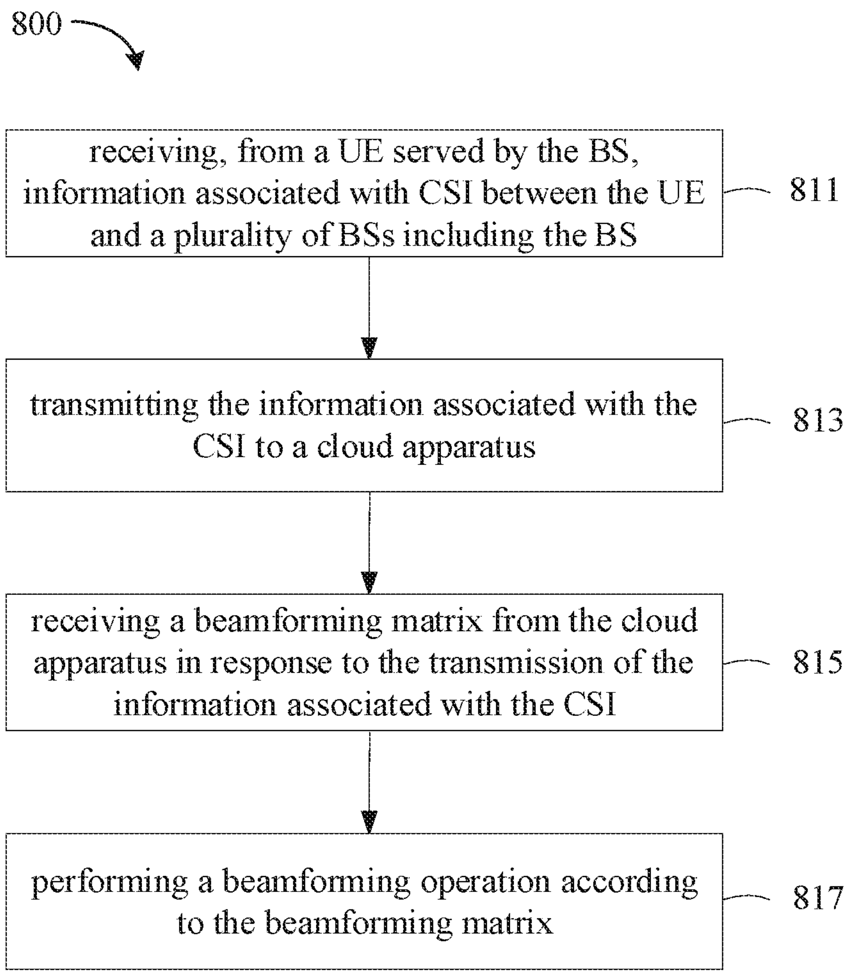
FIG. 8 illustrates a flow chart of an exemplary procedure performed by a BS in accordance with some embodiments of the present disclosure.

FIG. 8 illustrates a flow chart of an exemplary procedure 800 performed by a BS in accordance with some embodiments of the present disclosure. Details described in all of the foregoing embodiments of the present disclosure are applicable for the embodiments shown in FIG. 8. In some examples, the procedure may be performed by BS 102 in FIG. 1.

Referring to FIG. 8, in operation 811, a BS may receive, from a UE served by the BS, information associated with CSI between the UE and a plurality of BSs including the BS. The CSI between the UE and each of the plurality of BSs may indicate amplitude information related to a channel between the UE and a corresponding BS, phase information related to the channel between the UE and the corresponding BS, and a normalization factor associated with the amplitude information. For example, the information associated with CSI between the UE and the plurality of BSs may be the encoded CSI matrix (e.g., the index for the CSI matrix) as described above.

In operation 813, the BS may transmit the information associated with the CSI to a cloud apparatus (e.g., MBS 103 in FIG. 1). In some embodiments of the present disclosure, the BS may add an ID of the BS to the information associated with the CSI before the transmission.

In operation 815, the BS may receive a beamforming matrix from the cloud apparatus in response to the transmission of the information associated with the CSI. In operation 817, the BS may perform a beamforming operation according to the beamforming matrix.

It should be appreciated by persons skilled in the art that the sequence of the operations in exemplary procedure 800 may be changed and some of the operations in exemplary procedure 800 may be eliminated or modified, without departing from the spirit and scope of the disclosure.

Figure 9:
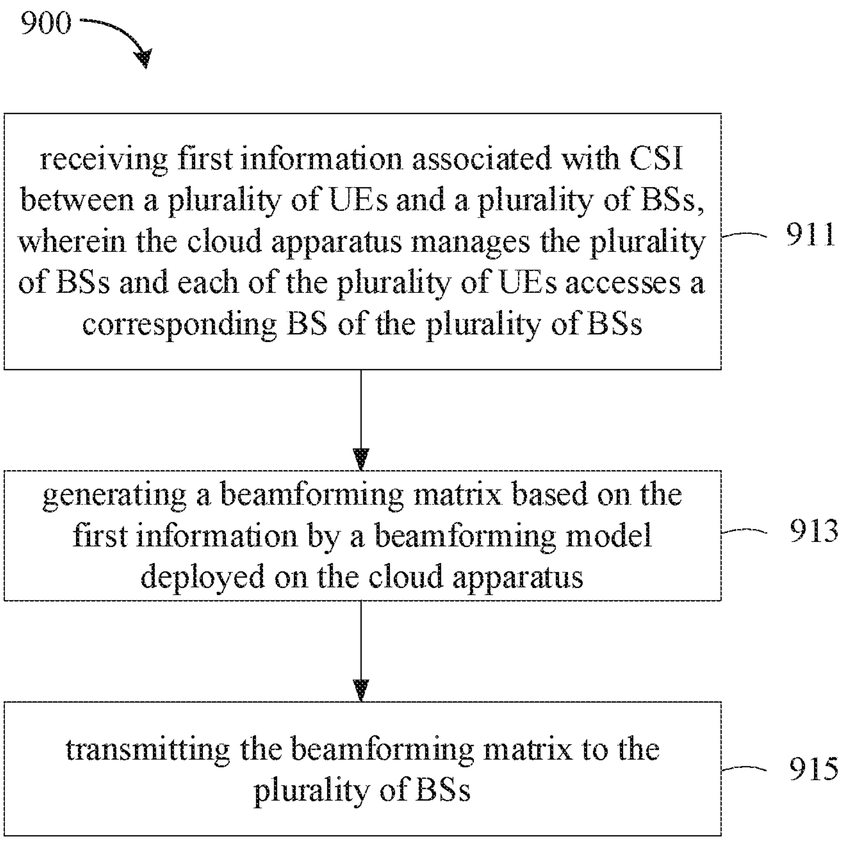
FIG. 9 illustrates a flow chart of an exemplary procedure performed by a cloud apparatus in accordance with some embodiments of the present disclosure.

FIG. 9 illustrates a flow chart of an exemplary procedure 900 performed by a BS in accordance with some embodiments of the present disclosure. Details described in all of the foregoing embodiments of the present disclosure are applicable for the embodiments shown in FIG. 9. In some examples, the procedure may be performed by MBS 103 in FIG. 1.

Referring to FIG. 9, in operation 911, a cloud apparatus may receive first information associated with CSI between a plurality of UEs and a plurality of BSs. The cloud apparatus may manage the plurality of BSs. Each of the plurality of UEs may access a corresponding BS of the plurality of BSs.

In some embodiments, the CSI between the plurality of UEs and the plurality of BSs may indicate: amplitude information related to a channel between a corresponding UE and a corresponding BS; phase information related to the channel between the corresponding UE and the corresponding BS; and a normalization factor associated with the amplitude information. In some examples, the cloud apparatus may combine the received information into a global CSI matrix. For instance, the cloud apparatus may decode the indexes of the encoded CSI matrixes and may form a global CSI matrix based on the decoded information.

In operation 913, the cloud apparatus may generate a beamforming matrix based on the first information by a beamforming model deployed on the cloud apparatus. The cloud apparatus may update the deployed beamforming model according to various policies.

In some examples, the cloud apparatus may update the deployed beamforming model periodically. In some examples, the cloud apparatus may update the deployed beamforming model according to the performance of the model, for example, when a performance decline of the beamforming model reaches a threshold. For example, the cloud apparatus may store the first information and calculation result (e.g., system rate) periodically, and use a mathematical method to evaluate the performance of the current model in an offline state. When the model performance drops to a threshold, the cloud apparatus may fine-tune the model parameters, such as weights.

In some embodiments, before deployment of a beamforming model, the cloud apparatus may design the beamforming model according to the actual application scenario. The cloud apparatus may train the model with pre-collected first information.

For example, the cloud apparatus may construct the beamforming model for determining a beamforming management scheme for the plurality of BSs. The cloud apparatus may train the beamforming model based on a plurality of the first information (e.g., a plurality of global CSI matrix). In some examples, the plurality of the first information may be the training set as described above. The cloud apparatus may deploy the trained beamforming model on the cloud apparatus in response to a completion of the training.

In some embodiments, the beamforming model may include an inception structure block, which may include at least two branches and at most one pooling layer for filtering input data. The at most one pooling layer may be included in one of the at least two branches. Each branch may include at least one convolutional layer. In some embodiments, the inception structure block may further include a shortcut. In some examples, the shortcut may connect an input of the inception structure block and an output of the inception structure block. In some examples, the shortcut may connect two internal functional layers of the inception structure block. In some embodiments, the beamforming model may further include an output activation layer (e.g., Lambda layer V in FIG. 3) for outputting the beamforming matrix. The output activation layer may ensure that the beamforming matrix satisfies a power constraint of the plurality of the BSs.

In some embodiments, training the beamforming model may include iteratively inputting the plurality of the first information into the beamforming model until an end condition is met. In some embodiments, for each iteration, the cloud apparatus may input the plurality of the first information in batches into the beamforming model, and may update a parameter(s) of the beamforming model (e.g., weights of the functional layers) according to a back propagation algorithm to improve a sum-rate of the plurality of UEs.

In some embodiments, the end condition may include one of the following: an improvement on a sum-rate of the plurality of UEs being less than or equal to an improvement threshold; and the number of iterations reaching a training threshold. In some embodiments, in response to the end condition being met, the cloud apparatus may determine whether a performance of the beamforming model satisfies a performance demand. The cloud apparatus may determine the completion of the training in response to determining that the performance of the beamforming model satisfies the performance demand. In some examples, the performance demand determination may be performed based on the test set as described above.

In some embodiments, in response to determining that the performance of the beamforming model fails to satisfy the performance demand, the cloud apparatus may perform at least one of the following: updating a parameter(s) of the beamforming model (e.g., weights of the functional layers) to satisfy the performance demand; and reconstructing the beamforming model and train the reconstructed beamforming model to satisfy the performance demand.

In operation 915, the cloud apparatus may transmit the beamforming matrix to the plurality of BSs. In some embodiments, the cloud apparatus may split the beamforming matrix into a plurality of beamforming sub-matrixes, each of which may be associated with a corresponding BS of the plurality of BSs. Transmitting the beamforming matrix to the plurality of BSs may include transmitting a beamforming sub-matrix of the plurality of beamforming sub-matrixes to a corresponding BS of the plurality of BSs. A BS can then perform a beamforming operation according to the received beamforming sub-matrix.

It should be appreciated by persons skilled in the art that the sequence of the operations in exemplary procedure 900 may be changed and some of the operations in exemplary procedure 900 may be eliminated or modified, without departing from the spirit and scope of the disclosure.

Figure 10:
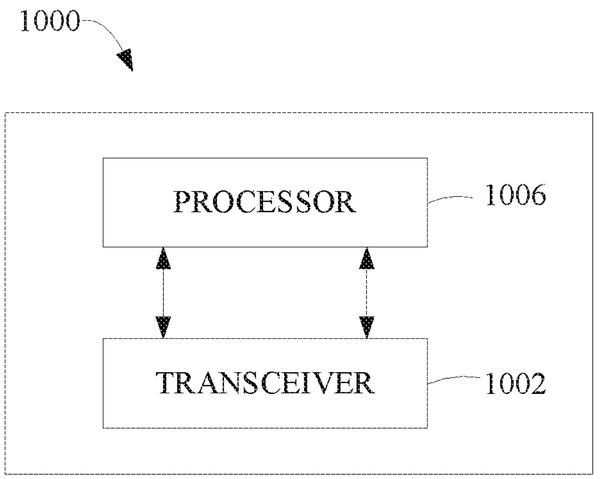
FIG. 10 illustrates a block diagram of an exemplary apparatus in accordance with some embodiments of the present disclosure.

FIG. 10 illustrates a block diagram of an exemplary apparatus 1000 according to some embodiments of the present disclosure.

As shown in FIG. 10, the apparatus 1000 may include at least one processor 1006 and at least one transceiver 1002 coupled to the processor 1006. The apparatus 1000 may be a UE, a BS (e.g., BS 102 in FIG. 1), or a cloud apparatus (e.g., MBS 103 in FIG. 1).

Although in this figure, elements such as the at least one transceiver 1002 and processor 1006 are described in the singular, the plural is contemplated unless a limitation to the singular is explicitly stated. In some embodiments of the present application, the transceiver 1002 may be divided into two devices, such as a receiving circuitry and a transmitting circuitry. In some embodiments of the present application, the apparatus 1000 may further include an input device, a memory, and/or other components.

In some embodiments of the present application, the apparatus 1000 may be a UE. The transceiver 1002 and the processor 1006 may interact with each other to perform the operations with respect to the UE described in FIGS. 1-9. In some embodiments of the present application, the apparatus 1000 may be a BS (e.g., BS 102 in FIG. 1). The transceiver 1002 and the processor 1006 may interact with each other to perform the operations with respect to the BS described in FIGS. 1-9. In some embodiments of the present application, the apparatus 1000 may be a cloud apparatus (e.g., MBS 103 in FIG. 1). The transceiver 1002 and the processor 1006 may interact with each other to perform the operations with respect to the cloud or cloud apparatus described in FIGS. 1-9.

In some embodiments of the present application, the apparatus 1000 may further include at least one non-transitory computer-readable medium.

For example, in some embodiments of the present disclosure, the non-transitory computer-readable medium may have stored thereon computer-executable instructions to cause the processor 1006 to implement the method with respect to the UE as described above. For example, the computer-executable instructions, when executed, cause the processor 1006 interacting with transceiver 1002 to perform the operations with respect to the UE described in FIGS. 1-9.

In some embodiments of the present disclosure, the non-transitory computer-readable medium may have stored thereon computer-executable instructions to cause the processor 1006 to implement the method with respect to the BS (e.g., BS 102 in FIG. 1) as described above. For F example, the computer-executable instructions, when executed, cause the processor 1006 interacting with transceiver 1002 to perform the operations with respect to the BS described in FIGS. 1-9.

In some embodiments of the present disclosure, the non-transitory computer-readable medium may have stored thereon computer-executable instructions to cause the processor 1006 to implement the method with respect to the cloud apparatus (e.g., MBS 103 in FIG. 1) as described above. For example, the computer-executable instructions, when executed, cause the processor 1006 interacting with transceiver 1002 to perform the operations with respect to the cloud or cloud apparatus in FIGS. 1-9.

Those having ordinary skill in the art would understand that the operations or steps of a method described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. Additionally, in some aspects, the operations or steps of a method may reside as one or any combination or set of codes and/or instructions on a non-transitory computer-readable medium, which may be incorporated into a computer program product.

While this disclosure has been described with specific embodiments thereof, it is evident that many alternatives, modifications, and variations may be apparent to those skilled in the art. For example, various components of the embodiments may be interchanged, added, or substituted in other embodiments. Also, all of the elements of each figure are not necessary for the operation(s) of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, the terms "includes," "including," or any other variation thereof, are intended to cover a non-exclusive inclusion, such that a process, method, article, or apparatus that includes a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that includes the element. Also, the term "another" is defined as at least a second or more. The term "having" and the like, as used herein, are defined as "including." Expressions such as "A and/or B" or "at least one of A and B" may include any and all combinations of words enumerated along with the expression. For instance, the expression "A and/or B" or "at least one of A and B" may include A, B, or both A and B. The wording "the first," "the second" or the like is only used to clearly illustrate the embodiments of the present application, but is not used to limit the substance of the present application.

What is claimed is:

1. A network apparatus for wireless communication, comprising:

at least one memory; and at least one processor coupled with the at least one memory and configured to cause the network apparatus to:

receive first information associated with channel state information (CSI) between a plurality of user equipment (UEs) and a plurality of base stations (BSs), wherein the network apparatus is configured to manage the plurality of BSs and each of the plurality of UEs is associated with a corresponding BS of the plurality of BSs;

generate a beamforming matrix based on the first information by a beamforming model deployed on a cloud apparatus, wherein the beamforming model comprises an inception structure block comprising at least two branches and at most one pooling layer for filtering input data which is included in one branch of the at least two branches, each branch including at least one convolutional layer; and transmit the beamforming matrix to the plurality of BSs.

2. The network apparatus of claim 1, wherein the CSI between the plurality of UEs and the plurality of BSs comprises:

amplitude information related to a channel between a corresponding UE and a corresponding BS;

phase information related to the channel between the corresponding UE and the corresponding BS; and a normalization factor associated with the amplitude information.

3. The network apparatus of claim 1, wherein the at least one processor is configured to cause the network apparatus to:

split the beamforming matrix into a plurality of beamforming sub-matrixes, wherein each of the plurality of beamforming sub-matrixes is associated with a corresponding BS of the plurality of BSs; and wherein transmitting the beamforming matrix to the plurality of BSs comprises transmitting a beamforming sub-matrix of the plurality of beamforming sub-matrixes to a corresponding BS of the plurality of BSs.

4. The network apparatus of claim 1, wherein the at least one processor is configured to cause the network apparatus to:

construct the beamforming model for determining a beamforming management scheme for the plurality of BSs;

train the beamforming model based on a plurality of the first information; and in response to a completion of the training, deploy the trained beamforming model on the network apparatus.

5. The network apparatus of claim 4, wherein to train the beamforming model, the at least one processor is configured to cause the network apparatus to:

iteratively input the plurality of the first information into the beamforming model until an end condition is met.

6. The network apparatus of claim 5, wherein for each iteration, the at least one processor is configured to cause the network apparatus to:

input the plurality of the first information in batches into the beamforming model; and update a parameter of the beamforming model according to a back propagation algorithm to improve a sum-rate of the plurality of UEs.

7. The network apparatus of claim 5, wherein the end condition comprises one or more of:

an improvement on a sum-rate of the plurality of UEs being less than or equal to an improvement threshold; or a number of iterations reaching a training threshold.

8. The network apparatus of claim 5, wherein the at least one processor is configured to cause the network apparatus to:

in response to the end condition being met, determine whether a performance of the beamforming model satisfies a performance demand; and determine the completion of the training in response to determining that the performance of the beamforming model satisfies the performance demand.

9. The network apparatus of claim 8, wherein in response to determining that the performance of the beamforming model fails to satisfy the performance demand, the at least one processor is configured to cause the network apparatus to one or more of:

update a parameter of the beamforming model to satisfy the performance demand; or reconstruct the beamforming model and train the reconstructed beamforming model to satisfy the performance demand.

10. The network apparatus of claim 5, wherein the at least one processor is configured to cause the network apparatus to one or more of:

update the beamforming model deployed on the network apparatus periodically; or update the beamforming model deployed on the network apparatus when a performance decline of the beamforming model reaches a threshold.

11. The network apparatus of claim 1, wherein the inception structure block further comprises a shortcut, and wherein the shortcut connects an input of the inception structure block and an output of the inception structure block, or the shortcut connects two internal functional layers of the inception structure block.

12. The network apparatus of claim 1, wherein the beamforming model further comprises an output activation layer for outputting the beamforming matrix, the output activation layer ensures that the beamforming matrix satisfies a power constraint of the plurality of the BSs.

13. A user equipment (UE) for wireless communication, comprising:

at least one memory; and at least one processor coupled with the at least one memory and configured to cause the UE to:

receive pilot signals from a plurality of base stations (BSs);

measure channel state information (CSI) between the UE and each of the plurality of BSs;

generate a CSI matrix based on the measured CSI between the UE and the plurality of BSs;

encode the CSI matrix; and transmit the encoded CSI matrix to at least one of the plurality of BSs for a beamforming matrix generation by a beamforming model, wherein the beamforming model comprises an inception structure block comprising at least two branches and at most one pooling layer for filtering input data which is included in one branch of the at least two branches, each branch including at least one convolutional layer.

14. The UE of claim 13, wherein the at least one processor is configured to cause the UE to select the at least one of the plurality of BSs based at least in part on one or more of signal strengths or distances between the UE and the plurality of BSs.

15. The UE of claim 13, wherein the CSI matrix comprises an indication of one or more of channel amplitude information associated with the plurality of BSs, channel phase information associated with the plurality of BSs, or a normalization factor associated with the channel amplitude information.

16. The UE of claim 13, wherein to encode the CSI matrix, the at least one processor is configured to cause the UE to:

quantize the CSI matrix according to an accuracy associated with a codebook; and compare the quantized CSI matrix with elements in the codebook to determine an index for the quantized CSI matrix.

17. The UE of claim 16, wherein:

to encode the CSI matrix, the at least one processor is configured to cause the UE to compress the index for the quantized CSI matrix; and to transmit the encoded CSI matrix, the at least one processor is configured to cause the UE to transmit the compressed index to the at least one of the plurality of BSs.

18. A processor for wireless communication, comprising:

at least one controller coupled with at least one memory and configured to cause the processor to:

receive pilot signals from a plurality of base stations (BSs);

measure channel state information (CSI) between a user equipment (UE) and each of the plurality of BSs;

generate a CSI matrix based on the measured CSI between the UE and the plurality of BSs;

encode the CSI matrix; and transmit the encoded CSI matrix to at least one of the plurality of BSs for a beamforming matrix generation by a beamforming model, wherein the beamforming model comprises an inception structure block comprising at least two branches and at most one pooling layer for filtering input data which is included in one branch of the at least two branches, each branch including at least one convolutional layer.

19. A method performed by a user equipment (UE), the method comprising:

receiving pilot signals from a plurality of base stations (BSs);

measuring channel state information (CSI) between the UE and each of the plurality of BSs;

generating a CSI matrix based on the measured CSI between the UE and the plurality of BSs;

encoding the CSI matrix; and transmitting the encoded CSI matrix to at least one of the plurality of BSs for a beamforming matrix generation by a beamforming model, wherein the beamforming model comprises an inception structure block comprising at least two branches and at most one pooling layer for filtering input data which is included in one branch of the at least two branches, each branch including at least one convolutional layer.

20. The method of claim 19, wherein the CSI matrix comprises an indication of one or more of channel amplitude information associated with the plurality of BSs, channel phase information associated with the plurality of BSs, or a normalization factor associated with the channel amplitude information.

* * * * *